United States Patent
Jialanella et al.

(10) Patent No.: US 9,290,607 B2
(45) Date of Patent: Mar. 22, 2016

(54) CURABLE COMPOSITIONS CONTAINING ISOCYANATE FUNCTIONAL COMPONENTS HAVING IMPROVED DURABILITY

(75) Inventors: Gary L Jialanella, Oxford, MI (US); Toni Ristoski, Shelby Twp., MI (US); Mike Frishcosy, Rochester, MI (US)

(73) Assignee: Dow Global Technologies LLC, Midland, MI (US)

( * ) Notice: Subject to any disclaimer, the term of this patent is extended or adjusted under 35 U.S.C. 154(b) by 165 days.

(21) Appl. No.: 13/885,279

(22) PCT Filed: Nov. 23, 2011

(86) PCT No.: PCT/US2011/062070
§ 371 (c)(1),
(2), (4) Date: May 14, 2013

(87) PCT Pub. No.: WO2012/087490
PCT Pub. Date: Jun. 28, 2012

(65) Prior Publication Data
US 2013/0233488 A1 Sep. 12, 2013

Related U.S. Application Data

(60) Provisional application No. 61/424,943, filed on Dec. 20, 2010.

(51) Int. Cl.
*B29C 65/00* (2006.01)
*B29C 65/48* (2006.01)
(Continued)

(52) U.S. Cl.
CPC .............. *C08G 18/778* (2013.01); *B29C 65/00* (2013.01); *B29C 65/48* (2013.01); *B29C 65/485* (2013.01); *B29C 65/487* (2013.01); *B29C 65/4865* (2013.01); *B29C 65/4875* (2013.01); *B32B 17/00* (2013.01); *B32B 17/061* (2013.01); *B32B 17/10* (2013.01); *B32B 27/00* (2013.01); *B32B 27/40* (2013.01); *B32B 37/00* (2013.01); *B32B 37/12* (2013.01); *B60J 1/00* (2013.01); *C08G 18/10* (2013.01); *C08G 18/12* (2013.01); *C08G 18/2081* (2013.01); *C08K 5/3435* (2013.01); *C08K 13/02* (2013.01); *C08L 75/04* (2013.01); *C09J 5/00* (2013.01); *C09J 175/02* (2013.01); *C09J 175/04* (2013.01); *C09J 175/12* (2013.01); *E06B 3/56* (2013.01); *E06B 3/64* (2013.01); *C08K 3/04* (2013.01); *C08K 5/005* (2013.01); *C08K 5/32* (2013.01)

(58) Field of Classification Search
CPC ...... B29C 65/00; B29C 65/48; B29C 65/485; B29C 65/4865; B29C 65/487; B29C 65/4875; B32B 17/00; B32B 17/061; B32B 17/10; B32B 27/00; B32B 27/40; B32B 37/00; B32B 37/12; B32B 2419/00; B32B 2605/00; B60J 1/00; C08J 3/18; C08J 3/20; C08J 3/24; C08J 3/241; C08J 5/124; C08J 2375/00; C08J 2375/04; C08K 3/00; C08K 3/0016; C08K 3/0033; C08K 3/0041; C08K 3/04; C08K 5/00; C08K 5/0016; C08K 5/0025; C08K 5/005; C08K 5/32; C08K 5/34; C08K 5/3435; C08K 13/02; C08L 75/00; C08L 75/04; C08L 2201/08; C08L 2312/00; C09J 5/00; C09J 9/00; C09J 11/00; C09J 11/04; C09J 11/06; C09J 175/00; C09J 175/04; C09J 2400/10; C09J 2400/143; C09J 2400/163; C09J 2475/00; C09J 175/12; C09J 175/02; E06B 3/56; E06B 3/64; C08G 18/10; C08G 18/12; C08G 18/2081; C08G 18/778

USPC .............. 524/495, 496, 589, 590; 52/204.62; 156/99, 106, 108, 295, 331.4, 331.7; 296/84.1; 428/423.1, 425.6; 528/65, 528/73, 85

See application file for complete search history.

(56) References Cited

U.S. PATENT DOCUMENTS 3,707,521 A 12/1972 De Santis
3,779,794 A 12/1973 De Santis
(Continued)

FOREIGN PATENT DOCUMENTS

CN 101535360 A 9/2009
CN 101273084 A 8/2012
(Continued)

OTHER PUBLICATIONS

Japanese Office Action for Japanese Application No. 2013-546153 dated Jul. 15, 2014.
Korean Office Action for Korean Application No. 2013-7018907 dated Jul. 15, 2014.
Determination of active HALS in weathered automotive paint systems I. Development of ESR based analytical techniques, A.V. Kucherov. Oct. 30, 1999.
39 Anaerobic Adhesives. Richard D. Rich Copyright 2003.
(Continued)

*Primary Examiner* — Patrick Niland
(74) *Attorney, Agent, or Firm* — The Dobrusin Law Firm, P.C.

(57) ABSTRACT

A composition comprising: a) one or more isocyanate functional prepolymers; b) one or more catalysts for the reaction of isocyanate moieties with hydroxyl groups; c) one or more reinforcing fillers; and d) a stabilizing amount of one or more compounds comprising a dihydrocarbyl hydroxylamine, an alicyclic hydroxylamine, a nitrile oxide of a dihydrocarbyl hydroxylamine or a nitrile oxide of an alicyclic hydroxylamine. In another embodiment the invention is a method of bonding two or more substrates together which comprises contacting the two or more substrates together with a composition according to this invention disposed along at least a portion of the area wherein the substrates are in contact. The compositions of the invention are useful as an adhesive to bond substrates together.

16 Claims, 3 Drawing Sheets

(51) Int. Cl.

| | | |
|---|---|---|
| B32B 17/00 | (2006.01) |
| B32B 17/10 | (2006.01) |
| B32B 27/00 | (2006.01) |
| B32B 27/40 | (2006.01) |
| B32B 37/00 | (2006.01) |
| B60J 1/00 | (2006.01) |
| C08G 18/00 | (2006.01) |
| C08G 18/08 | (2006.01) |
| C08G 18/28 | (2006.01) |
| C08G 18/77 | (2006.01) |
| C08K 3/04 | (2006.01) |
| C08L 75/00 | (2006.01) |
| C09J 4/00 | (2006.01) |
| C09J 101/00 | (2006.01) |
| C09J 201/00 | (2006.01) |
| E06B 3/00 | (2006.01) |
| E06B 3/964 | (2006.01) |
| E06B 5/00 | (2006.01) |
| E06B 7/00 | (2006.01) |
| E06B 3/64 | (2006.01) |
| C09J 175/12 | (2006.01) |
| E06B 3/56 | (2006.01) |
| B32B 17/06 | (2006.01) |
| B32B 37/12 | (2006.01) |
| C08G 18/10 | (2006.01) |
| C08G 18/12 | (2006.01) |
| C08G 18/20 | (2006.01) |
| C08K 13/02 | (2006.01) |
| C08L 75/04 | (2006.01) |
| C09J 175/04 | (2006.01) |
| C08K 5/3435 | (2006.01) |
| C09J 5/00 | (2006.01) |
| C09J 175/02 | (2006.01) |
| C08K 5/00 | (2006.01) |
| C08K 5/32 | (2006.01) |

(56) References Cited

U.S. PATENT DOCUMENTS

| | | | |
|---|---|---|---|
| 4,374,237 A | 2/1983 | Berger et al. |
| 4,525,511 A | 6/1985 | Kirby et al. |
| 4,538,920 A | 9/1985 | Drake |
| 4,687,533 A | 8/1987 | Rizk et al. |
| 4,780,520 A | 10/1988 | Rizk et al. |
| 5,063,269 A | 11/1991 | Hung |
| 5,082,147 A | 1/1992 | Jacobs |
| 5,164,473 A * | 11/1992 | Dormish et al. | 528/44 |
| 5,603,798 A * | 2/1997 | Bhat | 156/331.4 |
| 5,623,044 A | 4/1997 | Chiao |
| 5,852,137 A | 12/1998 | Hsieh et al. |
| 5,922,809 A | 7/1999 | Bhat et al. |
| 5,976,305 A | 11/1999 | Bhat et al. |
| 6,015,475 A | 1/2000 | Hsieh |
| 6,355,838 B1 | 3/2002 | Huffman et al. |
| 6,512,033 B1 | 1/2003 | Wu |
| 6,709,539 B2 | 3/2004 | Zhou |
| 6,965,008 B2 | 11/2005 | Symietz et al. |
| 2002/0086743 A1* | 7/2002 | Bulpett et al. | 473/371 |
| 2002/0100550 A1 | 8/2002 | Mahdi et al. |
| 2005/0054764 A1* | 3/2005 | Zhou et al. | 524/495 |
| 2006/0270807 A1 | 11/2006 | Zhu et al. |
| 2007/0072965 A1 | 3/2007 | Kanouni |
| 2008/0057316 A1 | 3/2008 | Landon |
| 2008/0058478 A1 | 3/2008 | Kuntimaddi |
| 2009/0247720 A1 | 10/2009 | Wang et al. |
| 2014/0290855 A1* | 10/2014 | Ristoski et al. | 156/331.7 |

FOREIGN PATENT DOCUMENTS

| | | |
|---|---|---|
| EP | 1433802 | 12/2002 |
| JP | 59/102950 | 6/1984 |
| JP | 2002/234996 | 8/2002 |
| JP | 2003024471 A | 1/2003 |
| JP | 2003034756 A | 2/2003 |
| JP | 2004516225 A | 6/2004 |
| JP | 2004516370 A | 6/2004 |
| JP | 2004269690 A | 9/2004 |
| JP | 2005250438 A | 9/2005 |
| JP | 2005/298812 | 10/2005 |
| JP | 2006/016575 | 1/2006 |
| JP | 2006104407 A | 4/2006 |
| JP | 2007529585 A | 10/2007 |
| JP | 2008510046 A | 4/2008 |
| JP | 2009509018 A | 3/2009 |
| JP | 2009522306 A | 6/2009 |
| JP | 2009143380 A | 7/2009 |
| JP | 2010-502477 A | 1/2010 |
| JP | 2010531383 A | 9/2010 |
| KR | 2008-0057234 | 6/2008 |
| SU | 468/939 | 4/1975 |
| WO | WO 2007/039434 * | 4/2007 |
| WO | 2008/027499 A2 | 3/2008 |

OTHER PUBLICATIONS

Mechanisms of Action and Reactivities of the Free Radicals of Inhibitors. Evgenity T. Denisov Aug. 1, 1986.

Hahner, U. Studies on the Thermooxidation of Ethers and Polyethers: Part I—The Uninhibited Themooxidation of Polyether *Polymer Degradation and Stability*. (1991).

Pospisil, Jan. *Oxidation Inhibition in Organic Materials, Volume I.* Boca Raton, Florida: CRC Press, 1990.

Product Data Sheet BNX (TM) 2000. Mayzo, Inc.(www.mayzo.com).

Search Report and Written Opinion dated May 3, 2012 PCT/US2011/062070.

Written Opinion dated Jan. 15, 2013 PCT/US2011/062070.

International Preliminary Report on Patentability dated Dec. 4, 2013 PCT/US2011/062070.

Translation of Japanese Office action for Japanese Application No. 2013-546453, dated Jul. 15, 2014.

Chinese Office Action dated Apr. 23, 2014 for Chinese Patent Application No. 201180061085.9.

Translation of Korean Office action for Application No. 2013-7018907, dated Feb. 13, 2015.

* cited by examiner

CURABLE COMPOSITIONS CONTAINING ISOCYANATE FUNCTIONAL COMPONENTS HAVING IMPROVED DURABILITY

CLAIM OF PRIORITY

This application is a national phase filing under 35 USC §371 from PCT Application serial number PCT/US2011/062070 filed on Nov. 23, 2011, and claims prior therefrom. This application further claims priority from U.S. Provisional Application Ser. No. 61/424,943 filed Dec. 20, 2010, both incorporated herein by reference.

FIELD OF THE INVENTION

The present invention relates generally to curable compositions containing isocyanate functional components which exhibit improved durability. The present invention further relates to methods of preparing molded products, foams and adhesives based on such curable compositions. The invention also relates to bonding substrates, such as windows, together utilizing the compositions containing isocyanate functional components.

BACKGROUND OF THE INVENTION

Compositions having isocyanate functional components are utilized in a variety of useful products such as adhesives, molded products and foams. Such compositions are utilized in construction, vehicle manufacture, assembly of electronic subassemblies and devices, toys and the like. The adhesives are used to bond substrates together. Such adhesives have found widespread use because they allow for reasonable processing conditions and exhibit good adhesion to many substrates. One common use of such compositions is to bond glass, often in the form of windows, into structures. In automotive assembly plants windows are often bonded in with one part adhesive compositions containing isocyanate functional components. One-part isocyanate functional adhesives typically contain one or more isocyanate functional materials in the form of polyisocyanates or isocyanate functional prepolymers and a catalyst for the cure of the adhesive. Typically, these adhesives cure as a result of exposure to moisture and are protected from moisture until applied to a substrate. One part adhesives are used because the equipment required to dispense and apply the adhesives is less complex than the equipment used to apply two-part adhesive compositions. One part moisture curing adhesives known in the art are disclosed in U.S. Pat. No. 4,374,237, U.S. Pat. No. 4,687,533, U.S. Pat. No. 4,780,520, U.S. Pat. No. 5,063,269, U.S. Pat. No. 5,623,044, U.S. Pat. No. 5,603,798, U.S. Pat. No. 5,852,137, U.S. Pat. No. 5,922,809, U.S. Pat. No. 5,976,305, U.S. Pat. No. 5,852,137 and U.S. Pat. No. 6,512,033, relevant portions incorporated herein by reference. Examples of commercial one part adhesives include BETASEAL™ 15630, 15625, 61355 adhesives available from The Dow Chemical Company, EFBOND™ windshield adhesives available from Eftec, WS 151™, WS212™ adhesives available from Yokohama Rubber Company, and SIKAFLEX™ adhesives available from Sika Corporation.

A two-part polyisocyanate based adhesive comprises, in one part, a polyisocyanate or an isocyanate functional prepolymer and in a second part a curing agent and catalyst for the reaction of the curing agent with isocyanate groups. Typically, the curing agent is a compound having on average more than one active hydrogen atom, for instance an amine or hydroxyl moiety. Two part adhesives are often used for bonding replacement windows into vehicles. Examples of such systems include the adhesive systems disclosed in the commonly owned patent application titled COMPOSITION USEFUL AS AN ADHESIVE FOR INSTALLING VEHICLE WINDOWS filed in the United States on Jun. 3, 2007 having a Ser. No. 11/824,984 and filed in the PCT on Jun. 5, 2007 having a serial number PCT/US07/013; U.S. Pat. No. 6,965,008; EP 1433802 and EP 1578834, all incorporated herein by reference. The adhesive starts to cure when the two parts are contacted. Two-part adhesives have the advantage that they cure much faster than one-part adhesives.

Such products can undergo degradation in properties with use and exposure to natural elements. Exposure to sunlight, humidity and thermal cycling can impact the rate of degradation. To reduce or prevent this from occurring stabilizers are commonly added to the formulations utilized to prepare cured polyurethanes. See for example Wu U.S. Pat. No. 6,512,033 and Zhu et al. United States Patent Application 2006/0270807 paragraphs 0043 to 0046.

Due to market conditions manufacturers of isocyanate based compositions may need to change ingredients utilized in the curable compositions (such as adhesives). Many compositions containing isocyanate functional prepolymers are sensitive systems in that changes in ingredients can alter how the adhesive compositions function or perform (e.g. adhesive systems). Some ingredients such as fillers, plasticizers, thixotropes and the like when changed can impact how curable compositions function and the durability of the compositions. Such changes may result in stabilizer packages becoming ineffective in the altered composition.

Curable compositions that exhibit improved durability are desired. There is a need for compositions (e.g. adhesive) containing isocyanate functional prepolymers which have improved stabilizer packages to replace known stabilization packages which are found not to function properly, especially in compositions where ingredients (such as fillers and/or plasticizers) have been changed. Such compositions exhibit good durability in use and in tests designed to predict long term durability.

SUMMARY OF THE INVENTION

The present invention relates to a composition comprising a) one or more isocyanate functional components; b) one or more catalysts for the reaction of isocyanate moieties with active hydrogen atom containing groups; and c) one or more compounds comprising a dihydrocarbyl hydroxylamine, an alicyclic hydroxylamine, or a nitrile oxide of a dihydrocarbyl hydroxylamine or an alicyclic hydroxylamine in a sufficient amount to enhance the durability of the composition in a cured state. In a preferred embodiment the composition contains a filler. The composition can be a one part curable composition or a two part curable composition.

In one embodiment the composition relates to a one part curable composition comprising: a) one or more isocyanate functional prepolymers; b) one or more catalysts for the reaction of isocyanate moieties with hydroxyl groups; c) one or more reinforcing fillers; and d) a stabilizing amount of one or more compounds comprising a dihydrocarbyl hydroxylamine, an alicyclic hydroxylamine, a nitrile oxide of a dihydrocarbyl hydroxylamine or a nitrile oxide of an alicyclic hydroxylamine. In a preferred embodiment, the composition further comprises one or more plasticizers. More preferably the one or more plasticizers comprise one or more branched plasticizers. In another preferred embodiment the reinforcing filler is one or more grades of carbon black and most preferably is one or more high surface area grades of carbon black.

In another embodiment the invention relates to a two part curable composition comprising in part 1 one or more isocyanate functional components; and in part 2 one or more catalysts for the reaction of isocyanate moieties with active hydrogen atom containing groups and one or more curing agents, the curing agents are preferably components containing more than one active hydrogen containing groups; and the composition further comprises one or more compounds comprising a dihydrocarbyl hydroxylamine, an alicyclic hydroxylamine, a nitrile oxide of a dihydrocarbyl hydroxylamine or a nitrile oxide of an alicyclic hydroxylamine, in a sufficient amount to enhance the durability of the composition in a cured state, which may be present in part 1, part 2 or both. The curing agent is preferably one or more of polyols, polyamines, crosslinking agents and chain extenders.

In another embodiment the invention relates to a method of bonding two or more substrates together which comprises contacting the two or more substrates together with a composition according to this invention disposed along at least a portion of the area wherein the substrates are in contact. Preferably, one of the substrates is window glass or abrasion coated transparent plastic. Preferably, at least one of the other substrates is a building or a vehicle. In the embodiment wherein the curable composition is a two part composition, the two parts are contacted prior to contacting the curable composition with the surface of one or more of the substrates.

In another embodiment the invention related to a method for making a reaction injected molded part which comprises injecting a composition as described herein into a mold and subjecting the components to conditions, such as suitable temperatures and pressures, so as to form a molded part. Preferably, such parts can be utilized in automotive uses such as body parts, fascia and trim.

In another embodiment the two part compositions as described herein may further comprise one or more known blowing agents. Such composition may be sprayed into molds or injected into molds under conditions such that an open or closed cell polyurethane foam is prepared. Such foams can be used as insulation foam, seating cushions, headliners or molded parts.

The compositions of the invention are useful in any known use of curable compositions containing isocyanate functional components, such as coatings, adhesives, open and closed cell foams, molded products and the like. The curable compositions of the invention may be used as an adhesive to bond substrates together. A variety of substrates may be bonded together using the composition, for instance, plastics, glass, wood, ceramics, metal, coated substrates and the like. The compositions of the invention may be used to bond similar and dissimilar substrates together. The compositions are especially useful for bonding glass or transparent plastic structures to other substrates such as vehicles and buildings. The compositions of the invention are also useful in bonding parts of modular components together, such as vehicle modular components. The glass or transparent plastic structures can be bonded to coated and uncoated portions of vehicles. The compositions of the invention exhibit excellent durability once cured, that is the cured compositions resist degradation. These compositions demonstrate excellent properties in accelerated aging tests. In one accelerated aging test several samples of a cured adhesive are exposed to high temperatures, such as about 90° C. or greater, or about 100° C. or greater, for extended periods of time, for instance for greater than about 30 days or greater than about 45 days. Thereafter the cured samples are tested for adhesion according to the Quick Knife Adhesion test. Preferably the adhesives tested under such conditions exhibit 100 percent cohesive failure after exposure to such conditions. Structures bonded together utilizing such adhesive compositions remain bonded together for a substantial portion or all of the structures useful life.

DETAILED DESCRIPTION

Figure 1:
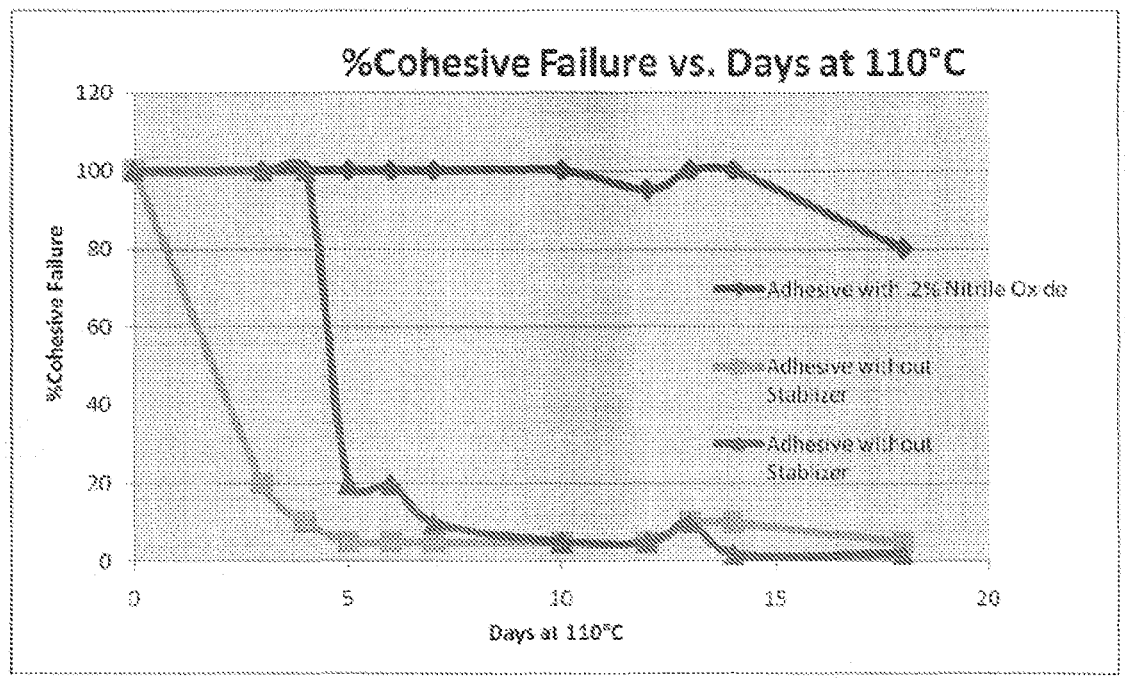
FIG. 1 is a graphical representation of the data contained in Table 1.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

One or more as used herein means that at least one, or more than one, of the recited components may be used as disclosed. Nominal as used with respect to functionality means the theoretical functionality, generally this can be calculated from the stoichiometry of the ingredients used. Generally, the actual functionality is different due to imperfections in raw materials, incomplete conversion of the reactants and formation of by-products. "Durability" in this context means that the composition once cured remains sufficiently strong to perform its designed function, in the embodiment wherein the cured composition is an adhesive the adhesive holds substrates together, for the life or most of the life of the structure containing the cured composition. As an indicator of this durability the curable composition (e.g. adhesive) preferably exhibits excellent results during accelerated aging testing as described herein. Preferably this means that after a set of substrates bonded with the adhesive of the invention is exposed to heat aging the failure mode in Quick Knife adhesion or Lap Shear testing is cohesive, meaning the adhesive breaks before the bond of the adhesive to the substrate breaks. "Isocyanate content" means the weight percentage of isocyanate moieties based on the total weight of the prepolymer.

The compositions of this invention can be any reactive system containing isocyanate functional components which are curable. "Reactive" means herein that the curable composition (e.g. adhesive) contains components which react to form a polymeric matrix that is set irreversibly once cured. The curable systems can be either one or two-part systems. More preferred are one part systems. Preferably the curable systems are useful as adhesives.

Isocyanate based (polyurethane or polyurea forming) curable systems comprise an isocyanate functional component. An isocyanate functional component contains one or more compounds having on average more than one isocyanate functional group per molecule. The isocyanate functional compound can be any compound which contains on average more than one isocyanate moiety. The isocyanate functional compound can be in the form of an isocyanate functional prepolymer or in the form of a monomer or oligomer having on average greater than 1 isocyanate group, and preferably 2 or more isocyanate groups. The isocyanate prepolymer can by any prepolymer prepared by reaction of an isocyanate functional compound with one or more compounds having on average more than one isocyanate reactive functional groups, such as hydroxyl, amine, thiol, carboxyl and the like, under conditions such that the prepolymer prepared have on average more than one isocyanate moiety (group) per molecule. Polyisocyanate based systems can be one part or two-part systems. The isocyanate functional component is present in the curable composition in a sufficient amount to form a cured component when exposed to curing conditions. In two-part adhesive compositions, the isocyanate functional component when combined with isocyanate reactive compounds is capable of bonding substrates together in a manner that the substrates remain bound together when exposed to temperatures of about −30° C. to about 100° C. for long periods of time, such as 10 years; and up to temperatures of about 180° C. for short periods of up to 30 minutes.

In a one-part system the isocyanate functional component further comprises a catalyst and other components as described hereinafter. The one component adhesive systems typically cure by moisture curing. Once formulated the one-part adhesive systems are packaged in air and moisture proof containers to prevent curing before application.

In another embodiment, the curable system used in the invention is a two-part polyisocyanate containing curable system. The two parts are reactive with one another and when contacted undergo a curing reaction. One part of the composition comprises, or contains, an isocyanate functional component. This is typically referred to as the resin side or A side. The other component of the composition is an isocyanate reactive component which comprises, or contains, one or more compounds, oligomers or prepolymers having on average more than one group reactive with isocyanate moieties as described herein. The second part is commonly known as the curative or B side. Compounds having on average one or more isocyanate reactive groups can be prepolymers or can be small chain compounds such as difunctional chain extenders or polyfunctional crosslinking agents known in the art. Typically, the chain extenders and crosslinking agents have a molecular weight of about 250 Daltons or less. A catalyst as described hereinbefore may be utilized in the curative side. The reaction product is a cured product which is capable of performing the desired function, such as bonding certain substrates together.

In those embodiments using an isocyanate functional prepolymer, the one or more isocyanate functional prepolymers are present in sufficient quantity to provide cohesive strength, and in adhesive uses, adhesive character to the composition. Such prepolymers have an average isocyanate functionality sufficient to allow the preparation of a crosslinked polyurethane upon cure and not so high that the polymers are unstable. The prepolymers are prepared by reacting one or more polyisocyanates with one or more compounds containing on average more than one isocyanate reactive group per molecule. The prepolymer preferably has a free isocyanate content which facilitates acceptable strength in the compositions prepared from the prepolymers, preferably after 60 minutes. For one-part moisture curable systems, the isocyanate content in the prepolymers is preferably in the range of about 0.1 percent to about 10 percent, more preferably in the range of about 1.5 percent to about 5.0 percent and most preferably in the range of about 1.8 percent to about 3.0 percent. In one part adhesive compositions, preferably the free isocyanate content is about 1.2 percent by weight or greater based on the weight of the prepolymer and more preferably about 1.4 percent by weight or greater, and most preferably about 1.6 percent by weight or greater, and preferably about 2.2 percent by weight or less, more preferably about 2.0 or less, even more preferably about 1.8 percent by weight or less. Above about 2.2 percent by weight, adhesives prepared from the prepolymer may demonstrate lap shear strengths after 60 minutes which are too low for the intended use. Below about 1.2 percent by weight, the prepolymer viscosity is too high to handle and the working time is too short. As is well known to the expert in the art, the polydispersity by definition is 1.0 or greater. The prepolymers preferably exhibit a polydispersity of about 2.5 or less, more preferably about 2.3 or less and most preferably about 2.1 or less. Preferred isocyanate prepolymers used in the adhesive compositions of the invention do not contain silane groups, that is are substantially free of silane groups (preferably less that 1 percent by weight of silane groups and more preferably less than 0.1 percent by weight of silane groups). For two-part isocyanate based adhesive systems, the isocyanate content in the prepolymers is preferably in the range of about 6 percent to about 35 percent by weight, more preferably in the range of about 8 percent to about 30 percent by weight and most preferably in the range of about 10 percent to about 25 percent by weight.

Preferably, the viscosity of the prepolymer is about 200 Pa·s or less, and more preferably about 150 Pa·s or less, and most preferably about 120 Pa·s or less. Preferably, the viscosity of the prepolymer is about 50 Pa·s or greater. The viscosity of the adhesive can be adjusted with fillers. Below about 50 Pa·s an adhesive prepared from the prepolymer may exhibit poor high speed tensile strength. Above about 150 Pa·s the prepolymer may be unstable and hard to pump. "Viscosity" as used herein is measured by the Brookfield Viscometer, Model DV-E with a RV spindle #5 at a speed of 5 revolutions per second and at a temperature of 23° C.

Preferably, the polyisocyanates for use in preparing the prepolymer include any aliphatic, cycloaliphatic, araliphatic, heterocyclic or aromatic polyisocyanate, or mixtures thereof. Preferably, the polyisocyanates used have an average isocyanate functionality of about 2.0, or greater and an equivalent weight of about 80 or greater. Preferably, the isocyanate functionality of the polyisocyanate is about 2.0 or greater, more preferably about 2.2 or greater, and is most preferably about 2.4 or greater; and is preferably about 4.0 or less, more preferably about 3.5 or less, and most preferably about 3.0 or less. Higher functionality may also be used, but may cause excessive cross-linking, and result in a composition which is too viscous to handle and apply easily, and can cause the cured composition to be too brittle. Preferably, the equivalent weight of the polyisocyanate is about 80 or greater, more preferably at about 110 or greater, and is most preferably about 120 or greater; and is preferably about 300 or less, more preferably about 250 or less, and most preferably about 200 or less.

Examples of preferable polyisocyanates include those disclosed by Wu, U.S. Pat. No. 6,512,033 at column 3, line 3 to line 49, incorporated herein by reference. More preferred isocyanates are aromatic isocyanates, alicyclic isocyanates and derivatives thereof. Preferably, the aromatic isocyanates have the isocyanate groups bonded directly to aromatic rings. Even more preferred polyisocyanates include diphenylmethane diisocyanate and polymeric derivatives thereof, isophorone diisocyanate, tetramethylxylene diisocyanate, 1,6-hexamethylene diisocyanate and polymeric derivatives thereof, bis(4-isocyanatocylohexyl)methane, and trimethyl hexamethylene diisocyanate. The most preferred isocyanate is diphenylmethane diisocyanate. The amount of isocyanate containing compound used to prepare the prepolymer is that amount that gives the desired properties, that is, the appropriate free isocyanate content and viscosities as discussed hereinbefore. Preferably, the isocyanates are used to prepare in the prepolymer in an amount of about 1.3 equivalents of isocyanate (NCO) per equivalent of active hydrogen or greater, more preferably about 1.4 equivalents of isocyanate or greater and most preferably about 1.5 equivalents of isocyanate or greater. Preferably, the polyisocyanates used to prepare the prepolymer are used in an amount of about 2.0 equivalents of isocyanate per equivalent of active hydrogen or less, more preferably 1.8 equivalents of isocyanate or less and most preferably about 1.6 equivalents of isocyanate or less.

Preferably the isocyanate functional prepolymers are the reaction product of one or more polyisocyanates and one or more isocyanate reactive compounds wherein an excess of polyisocyanate is present on an equivalents basis. The term "isocyanate-reactive compound" as used herein includes any organic compound having nominally at least two isocyanate-reactive moieties. For the purposes of this invention, an active hydrogen containing moiety refers to a moiety containing a hydrogen atom which, because of its position in the molecule, displays significant activity according to the Zerewitinoff test described by Wohler in the *Journal of the American Chemical Society*, Vol. 49, p. 3181 (1927). Illustrative of such active hydrogen moieties are —COOH, —OH, —NH$_2$, —NH—, —CONH$_2$, —SH, and —CONH—. Preferable active hydrogen containing compounds include polyols, polyamines, polymercaptans and polyacids. More preferably, the isocyanate reactive compound is a polyol, and is even more preferably a polyether polyol.

Preferably the isocyanate functional prepolymers are the reaction product of one or more polyisocyanates with one or more polyols, preferably a mixture of one or more polyether diols and/or one or more polyether triols wherein an excess of polyisocyanate is present on an equivalents basis. The diols and triols are generically referred to as polyols. The term "isocyanate-reactive compound" as used herein includes any organic compound having nominally at least two isocyanate-reactive moieties. Preferably, polyols useful in the preparation of the prepolymers include those disclosed in Wu, U.S. Pat. No. 6,512,033 at column 4, line 10 to line 64, incorporated herein by reference, and include, for example, polyether polyols, polyester polyols, poly(alkylene carbonate)polyols, hydroxyl containing polythioethers and mixtures thereof. Preferred polyols are polyether polyols containing one or more alkylene oxide units in the backbone of the polyol. Preferred alkylene oxide units are ethylene oxide, propylene oxide, butylene oxide and mixtures thereof. The alkylene oxides can contain straight or branched chain alkylene units. Preferably, the polyol contains propylene oxide units, ethylene oxide units or a mixture thereof. In the embodiment where a mixture of alkylene oxide units is contained in a polyol, the different units can be randomly arranged or can be arranged in blocks of each alkylene oxides. In one preferred embodiment, the polyol comprises propylene oxide chains with ethylene oxide chains capping the polyol. In a preferred embodiment, the polyols are a mixture of diols and triols. Preferably, the isocyanate-reactive compound has a functionality of about 1.8 or greater, more preferably about 1.9 or greater, and is most preferably about 1.95 or greater; and is preferably about 4.0 or less, more preferably about 3.5 or less, and is most preferably about 3.0 or less. Preferably, the equivalent weight of the isocyanate-reactive compound is about 200 or greater, more preferably about 500 or greater, and is more preferably about 1,000 or greater; and is preferably about 5,000 or less, more preferably about 3,000 or less, and is most preferably about 2,500 or less.

In one preferred embodiment, the adhesive compositions further comprise one or more prepolymers containing one or more organic based polymers dispersed therein. Preferably, the organic based polymer is included in the prepolymer by inclusion of a dispersion triol having dispersed therein particles of an organic based polymer. The preferable dispersion triols are disclosed in Zhou, U.S. Pat. No. 6,709,539 at column 4, line 13 to column 6, line 18, incorporated herein by reference. Preferably, the triols used to disperse the organic particles is one or more polyether triols and more preferably one or more polyoxyalkylene based triols. Preferably, such polyoxyalkylene oxide triols comprise polyoxypropylene chains with a polyoxyethylene end caps. Most preferred triols are ethylene oxide-capped polyols prepared by reacting glycerin with propylene oxide, followed by reacting the product with ethylene oxide. In one embodiment, the prepolymer also comprises a dispersion triol having dispersed therein particles of an organic based polymer. Preferably, the triols used have a molecular weight of about 4,000 or greater and more preferably about 5,000 or greater. Preferably, the triols exhibit molecular weights of about 8,000 or less and more preferably about 7,000 or less. Preferably, the particles dispersed in the dispersion triol comprise one or more of thermoplastic polymers, rubber-modified thermoplastic polymers or a polyureas dispersed in one or more triols. The polyureas preferably comprise the reaction product of one or more polyamines and one or more polyisocyanates. Preferably such dispersion triol based prepolymers are contained in the adhesive in an amount below about 5 percent by weight.

The compounds containing active hydrogen groups are present in an amount sufficient to react with most of the isocyanate groups of the isocyanates leaving enough isocyanate groups to correspond with the desired free isocyanate content of the prepolymer. Preferably, the containing active hydrogen groups are present in an amount of about 50 parts by weight or greater based on the prepolymer, more preferably about 65 parts by weight or greater and most preferably about 80 parts by weight or greater. Preferably, the containing active hydrogen groups are present in an amount of about 90 parts by weight or less based on the prepolymer and most preferably about 85 parts by weight or less.

The prepolymers may be prepared by any suitable method, such as bulk polymerization and solution polymerization. The reaction to prepare the prepolymers is carried out under anhydrous conditions, preferably under an inert atmosphere such as a nitrogen blanket and to prevent crosslinking of the isocyanate groups by atmospheric moisture. The reaction is preferably carried out at a temperature from about 0° C. to about 150° C., more preferably from about 25° C. to about 90° C., until the residual isocyanate content determined by titration of a sample is very close to the desired theoretical value. The reactions to prepare the prepolymer may be carried out in the presence of urethane catalysts. Examples of such catalysts include the stannous salts of carboxylic acids, such as stannous octoate, stannous oleate, stannous acetate, and stannous laurate. Also, dialkyltin dicarboxylates such as dibutyltin dilaurate and dibutyltin diacetate are known in the art as urethane catalysts, as are tertiary amines and tin mercaptides. Preferably, the reaction to prepare the prepolymer is catalyzed by stannous octoate. The amount of catalyst employed is generally from about 0.005 to about 5 parts by weight of the mixture catalyzed, depending on the nature of the isocyanate. Preferably, the reaction is carried out in admixture with a plasticizer. The following procedures are used to prepare a prepolymer having the desired polydispersity. Preferably a polyether diol, having an effective functionality of at least about 1.9, preferably at least about 1.95 and a polyether triol, having an effective functionality of at least about 2.8, preferably at least about 2.9 are reacted with an aromatic polyisocyanate with a functionality of at least about 2.0. The polyether polyols may contain up to about 30 percent of ethylene oxide units. Preferred polyether diols have a molecular weight of about 1,000 to about 6,000 and preferred polyether triols have a molecular weight of about 3,000 to about 9,000 as calculated from the OH-number The prepolymers are present in the composition of the invention in a sufficient amount such that the cured composition has sufficient strength for its designed purpose, in the case of adhesive systems such that the adhesive is capable of bonding substrates together and to provide the desired cohesive and adhesive strengths. Preferably, the polyurethane prepolymer is present in an amount of about 10 percent by weight or greater based on the weight of the composition, more preferably about 30 percent by weight or greater and most preferably about 50 percent by weight or greater. Preferably, the polyurethane prepolymer is present in an amount of about 65 percent by weight or less based on the weight of the composition, more preferably about 60 percent by weight or less and most preferably about 55 percent by weight or less.

One-part polyisocyanate functional adhesive systems and either or both of the resin part and the curative part for two-part isocyanate functional systems may contain plasticizers, fillers, pigments, stabilizers and other additives commonly present in curable polyurethane forming adhesives. By the addition of such materials, physical properties such as rheology, flow rates and the like can be modified. However, to prevent premature hydrolysis of the moisture sensitive groups of the isocyanate functional component, fillers should be thoroughly dried before admixture therewith. The compositions of the invention may include ultraviolet stabilizers and antioxidants and the like.

The isocyanate functional prepolymers of the invention may further comprise a plasticizer. The plasticizers useful in the prepolymer are common plasticizers useful in polyurethane adhesive applications and well known to those skilled in the art. The plasticizer is present in an amount sufficient to disperse the prepolymer in the final adhesive composition. The plasticizer can be added to the adhesive either during preparation of the prepolymer or during compounding of the adhesive composition. Suitable plasticizers and solvents are well known in the art and include straight and branched alkylphthalates, such as diisononyl phthalate, dioctyl phthalate and dibutyl phthalate, a partially hydrogenated terpene commercially available as "HB-40", trioctyl phosphate, alkylsulfonic acid esters of phenol (Mesamoll, Bayer), toluene-sulfamide, adipic acid esters, castor oil, xylene, 1-methyl-2-pyrrolidinone and toluene. Preferably plasticizers are branched plasticizers. Preferred branched plasticizers are branched chain alkyl phthalates. More preferred branched plasticizers include di-isononyl phthalates (available under the Trademark PLATINOL N from BASF. The amount of plasticizer used is that amount sufficient to give the desired rheological properties and disperse the components in the composition of the invention. Preferably, the plasticizer is present in about 1 percent by weight or greater of the composition, more preferably about 5 percent by weight or greater and most preferably about 10 percent by weight or greater. Preferably, the plasticizer is present in about 50 percent by weight or less of the composition and more preferably about 40 percent by weight or less.

The composition of the invention comprises components to control the rheology, viscosity, pumpability and the sag characteristics of the composition. The materials included in the composition for these purposes include one or more fillers, one or more isocyanate functional polyester based prepolymers or a mixture thereof. These materials are added in a sufficient amount such that the composition exhibits the desired rheology, viscosity and the sag characteristics. Preferably these components are added in such that the composition exhibits a press flow viscosity of about 8 grams per minute or higher, more preferably about 12 grams per minute or higher and most preferably about 16 grams per minute or higher to allow for application with a manual dispensing gun.

The composition comprises one or more fillers. Fillers are added for a variety of reasons as described hereinbefore and one or more types of fillers may be utilized in the composition of this invention. Fillers may be added to reinforce the composition, to impart the appropriate viscosity and rheology and to strike a balance between cost and the desired properties of the composition and the parts of the composition. Preferred classes of fillers comprise one or more reinforcing fillers, such as one or more carbon blacks, one or more clays, one or more non-pigmented fillers, one or more thixotropes or combinations thereof. In a preferred embodiment, the fillers comprise one of more reinforcing carbon blacks and one or, more clays.

One preferred group of fillers useful in the invention are fillers that impart a balance of cost and viscosity to each part. Such fillers are preferably non-pigmented fillers and are used in a sufficient amount to impart an acceptable balance of viscosity and cost to the formulation and to achieve the desired properties of the composition. Among fillers useful for this purpose are talc, calcium carbonates, and kaolin. Preferred non pigmented fillers include calcium carbonate or kaolin. Calcium carbonates useful in this invention are standard calcium carbonates. Such standard calcium carbonates are untreated, that is, they are not modified by treatment with other chemicals, such as organic acids or esters of organic acids. Kaolin is also known as Kaolinite and comprises compounds represented by the chemical formula $Al_2Si_2O_5(OH)_4$, and it most often occurs as clay-sized, platelike, hexagonally shaped crystals. Preferably, the non-pigmented fillers are present in an amount sufficient to render the rheology of the composition suitable to function as desired, such as an adhesive applicable by hand-gun. Preferably, the non pigmented filler is present in an amount of about 0 percent by weight or greater, even more preferably about 3 percent by weight and most preferably about 5 percent by weight or greater. Preferably, the non pigmented filler is present in an amount of about 32 percent by weight or less and most preferably about 25 percent by weight or less.

The composition of this invention may further comprise a reinforcing filler which is present to improve the strength and rheology of the composition. The preferred class of reinforcing fillers comprises one or more forms of carbon black. The reinforcing filler is present in a sufficient amount to reinforce the composition and to improve the rheology of the composition. In automotive applications, nonconductivity is generally understood to mean an impedance of the composition of at least $10^{10}$ Ohm-cm. Preferably, the reinforcing filler is present in an amount such that the parts of the composition are nonconductive. If too much of certain reinforcing fillers, such as one or more forms of carbon black are present, the composition may be conductive. When carbon black is used as the reinforcing filler, the carbon black used may be a standard carbon black. Standard carbon black is carbon black which is not specifically surface treated or oxidized to render it nonconductive. One or more nonconductive carbon blacks may be used in conjunction with the standard carbon black. The amount of standard carbon black in the composition is that amount which provides the desired color, viscosity, sag resistance and strength. If nonconductivity of the composition is desired, standard carbon black may be utilized at a level at which the composition is nonconductive. In a preferred embodiment reinforcing filler is a high surface area carbon black. In one embodiment, high surface area carbon black is carbon black that exhibits an oil absorption of about 110 cc/100 g or greater and preferably about 115 cc/100 g or greater. In another embodiment, high surface area carbon black is carbon black that exhibits an iodine number of about 130 mg/g or greater and preferably about 150 mg/g or greater. Preferably the high surface area carbon black exhibits both of the defined oil absorption and iodine properties. Preferred high surface area carbon blacks include ELFTEX™57100, MONARCH RAVEN™ 1040 and RAVEN™ 1060 carbon blacks. The reinforcing filler, such as one or more forms of carbon black, is preferably present in the composition, based on the weight of the composition, in an amount by about 0 percent by weight or greater, more preferably by about 10 percent by weight or greater and most preferably about 14 percent by weight or greater. The reinforcing filler, such as one or more forms of carbon black, is preferably present the composition, based on the weight of the composition, in an amount of about 20 percent by weight or less, more preferably about 18 percent by weight or less, and most preferably about 16 percent by weight or less. If conductive carbon black is used, attention must be paid to keep the concentration below about 18 percent by weight in the overall composition to prevent the impedance of the composition to be above $10^{10}$ Ohm-cm, compositions below this amount are considered to be nonconductive. Standard carbon blacks are well known in the art and include RAVEN™ 790, RAVEN™ 450, RAVEN™ 500, RAVEN™ 430, RAVEN™ 420 and RAVEN™ 410 carbon blacks available from Colombian and CSX™ carbon blacks available from Cabot, and PRINTEX™30 carbon black available from Degussa. Nonconductive carbon blacks are well known in the art and include RAVEN™ 1040 and RAVEN™ 1060 carbon black available from Colombian.

Another class of filler useful in the composition is clays which are added for the purpose of improving the cost effectiveness, viscosity and nonconductive nature of the compositions of the invention. Preferred clays useful in the invention include kaolin, surface treated kaolin, calcined kaolin, aluminum silicates and surface treated anhydrous aluminum silicates. The clays can be used in any form which facilitates formulation of a composition having the desired properties, for example a composition that can be utilized a hand-dispensable adhesive. Preferably, the clay is admixed in the form of pulverized powder, spray-dried beads or finely ground particles. Clays may be used in an amount of about 0 percent by weight or greater of the composition of the invention, more preferably about 10 percent by weight or greater and even more preferably about 16 percent by weight or greater. Preferably, the clays are used in an amount of about 30 percent by weight or less of the composition of the invention and more preferably about 23 percent by weight or less.

The adhesive composition may further comprise a filler which functions as a thixotrope (rheological additive). Such thixotropes are well known to those skilled in the art and include fumed silica and the like. Preferred fumed silicas include organically modified fumed silicas. The thixotrope may be added to the composition in a sufficient amount to give the desired rheological properties. Preferably, the thixotrope is present in an amount of about 0 percent by weight or greater based on the weight of the composition of the invention, preferably about 0.5 percent by weight or greater. Preferably, the optional thixotrope is present in an amount of about 3 percent by weight or less based on the weight of the composition of the invention and more preferably about 2 percent by weight or less.

The compositions of the invention contain an alicyclic hydroxylamine, a dihydrocarbyl hydroxylamine; or nitrile oxide (nitroxyl) thereof, in an amount of such that the durability of the compositions is enhanced. Durability as used herein refers to preventing degradation of the cured compositions of the invention. In practical terms this means that the cured compositions retain their strength for the life of the product, or a significant portion of the life of the product. Accelerated aging tests can be performed to predict the durability of the composition. Exposing the cured composition to elevated temperatures, preferably about 90° C., more preferably about 100° C. and most preferably about 110° C., for several days, preferably at least 30 days and more preferably about 45 days and then performing quick knife testing on the cured samples provides good prediction on the long term stability of the cured composition. The desired outcome of the quick knife adhesion test is 100 percent cohesive failure, meaning the adhesive bond is stronger than the composition. In a preferred embodiment, the cured adhesive exhibits 100 percent cohesive failure in the quick knife adhesion test after exposure to 100° C. for 30 days and more preferably after exposure to 110° C. for 30 days.

Dihydrocarbyl hydroxylamines, alicyclic hydroxylamines and nitrile oxides thereof, useful herein include any such compounds which when included in the compositions of this invention improve the durability of the compositions as described herein. Alicyclic hydroxyl amine means a nitrogen containing aliphatic heterocycle wherein the nitrogen atom has a hydroxyl moiety bound thereto. The hydrocarbyl groups on the dihydrocarbyl hydroxylamine and the alicyclic hydroxylamines can be substituted with any substituent which does not significantly impact the performance of these additives in formulations of this invention. Preferred substituents include hydroxyl, alkyl groups, ethers, tertiary amines and sulfides, and the like. More preferred substituents include hydroxyl and alkyl groups. Even more preferred substituents include hydroxyl and methyl groups.

Preferred dihydrocarbyl hydroxylamines and alicyclic hydroxylamines correspond to the formula $(R^1)_2N$—OH wherein $R^1$ is independently in each occurrence a hydrocarbyl moiety or the two $R^1$ may combine to form a cyclic ring, wherein the hydrocarbyl groups or cyclic ring may be substituted with one or more substituents which do not interfere with the function of the compounds in this invention. Preferred substituents include hydroxyl, alkyl groups, ethers, tertiary amines and sulfides, and the like. More preferred substituents include hydroxyl and alkyl groups. Even more preferred substituents include hydroxyl and methyl groups.

Nitrile oxides (Nitroxyl) are compounds having the moiety —NO. Nitrile oxides may be prepared from the moiety —NOH utilizing known processes. The radical formed (—NO.) is stable under ambient conditions. In one embodiment, the nitroxyl or nitrile oxides are illustrated by the formula $(R^1)_2N$—O. wherein $R^1$ is described above.

Preferably $R^1$ is independently in each occurrence a $C_{2-30}$ alkyl, alkaryl or aryl moiety or two of $R^1$ form a $C_{2-30}$ cycloalkyl moiety wherein such moieties may contain one or more heteroatoms and/or be substituted with one or more substituents which do not interfere with the function of the compounds in this invention; more preferably a $C_{10\text{-}20}$ alkyl, alkaryl or aryl moiety and two $R^1$ form a $C_{2\text{-}7}$ cycloalkyl group optionally containing heteroatoms and/or substituents; with $C_{10\text{-}20}$ alkyl moieties being even more preferred. Heteroatoms as used herein are preferably N, O or S, with N and O preferred and N most preferred. In a preferred embodiment two of $R^1$ may from a piperidine ring. Preferred substituents are described above. Among preferred dihydrocarbyl hydroxylamines are hydroxylamine freebase from BASF, hydroxylamine derivatives from Mitsui Chemicals America, Inc., N-hydroxyl bis(N-benzyl)amine available as BNX 2000 from Mayzo Inc. and Irgastab FS Products from Ciba Specialty Chemicals which contains oxidized bis(hydrogenate tallow alkyl)amine, also described as bis(N-dodecyl) N-hydroxylamine and XENOXYL™ 4-hydroxy-2,2,6,6-tetramethyl piperidinyl oxide available from Avecia, Inc. and having the structure

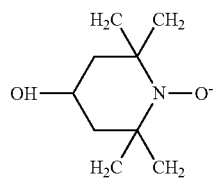

The hydroxylamine version of this compound corresponds to the formula

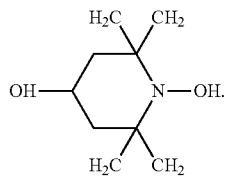

This compounds is 1,4-dihydroxy-2,2,6,6-tetramethylpiperidine.

The dihydrocarbyl hydroxylamines, alicyclic hydroxylamines or nitrile oxides thereof are utilized in a sufficient amount to enhance the durability of the compositions of the invention. Preferably the hydroxylamines or nitrite oxides thereof are used in an amount of about 0.01 parts based on 100 parts of the compositions of the invention or greater and more preferably about 0.1 parts or greater. Preferably the hydroxylamines or nitrile oxides thereof are used in an amount of about 1 part based on 100 parts of compositions of the invention or less and more preferably about 0.5 parts or less. The nitrile oxides are preferred over the corresponding hydroxylamines.

The composition may further comprise one or more isocyanate functional prepolymers containing one or more polyester based polyols which are solid at ambient temperature, about 23° C. The polyester based polyols have melting points such that the prepolymer provides sufficient green strength to prevent the substrates from moving in relation to one another due to gravitational forces at ambient temperatures. In terms of installing a window in a vehicle or building, the polyester based prepolymer prevents the window from sliding after installation. Preferably, the polyester polyols have melting points of about 40° C. or greater, even more preferably about 45° C. or greater and most preferably about 50° C. or greater. Preferably, the polyester polyols exhibit melting points of about 85° C. or less, even more preferably about 70° C. or less and most preferably about 60° C. or less. Preferably, the polyester polyol based isocyanate prepolymer is present in the adhesive composition in sufficient amount to support the needed green strength and the desired rheology of the composition. If the amount is too high, an adhesive composition is not hand gun applicable at ambient temperature. Preferably, the polyester polyol based isocyanate prepolymer is present in the adhesive composition in an amount of about 0 percent by weight or greater based on the weight of the adhesive composition, more preferably about 1 percent by weight or greater and most preferably about 2 percent by weight or greater. Preferably, the polyester polyol based isocyanate prepolymer is present in the adhesive composition in an amount of about 10 percent by weight or less, even more preferably about 5 percent by weight or less and most preferably about 3 percent by weight or less. The polyester polyol can be any polyester composition that meets the property requirements defined, which is crystalline at ambient temperatures and melts in the desired temperature range. Preferred polyester polyols are available from Creanova under the trade name DYNACOL and the designations 7381, 7360 and 7330, with 7381, most preferred.

The composition of the invention may further comprise a polyfunctional isocyanate for the purpose of improving the modulus of the composition in the cured form. "Polyfunctional" as used in the context of the isocyanates refers to isocyanates having a functionality of 3 or greater. The polyisocyanates can be any monomeric, oligomeric or polymeric isocyanates having a nominal functionality of about 3 or greater. More preferably, the polyfunctional isocyanates have a nominal functionality of about 3.2 or greater. Preferably, the polyfunctional isocyanates have a nominal functionality of about 5 or less, even more preferably about 4.5 or less and most preferably about 4.2 or less. The polyfunctional isocyanates can be any isocyanates which are reactive with the isocyanate polyisocyanate prepolymers used in the composition and which improve the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300, DESMODUR N-100, and polymeric isocyanates such as polymeric MDI (methylene diphenyl diisocyanates) such as those marketed by The Dow Chemical Company under, the trademark of PAPI, including PAPI 20 polymeric isocyanate. The polyfunctional isocyanates are present in a sufficient amount to impact the modulus of the cured compositions of the invention. If too much is used, the cure rate of the composition is unacceptably slowed down. If too little is used, the desired modulus levels are not achieved. The polyfunctional isocyanate is preferably present in an amount of about 0.5 percent by weight or greater based on the weight of the adhesive composition, more preferably about 1.0 percent by weight or greater and most preferably about 1.4 percent by weight or greater. The polyfunctional isocyanate is preferably present in an amount of about 8 percent by weight or less, based on the weight of the adhesive composition, more preferably about 5 percent by weight or less and most preferably about 3 percent by weight or less.

The compositions also contain one or more catalysts which catalyzes the reaction of isocyanate moieties with water or an active hydrogen containing compound. Such compounds are well known in the art. The catalysts can be any catalysts known to the skilled artisan for the reaction of isocyanate moieties with water or active hydrogen containing compounds. Among preferred catalysts are organotin compounds, metal alkanoates, and tertiary amines. Mixtures of classes of catalysts may be used. A mixture of a tertiary amine and a metal salt is preferred. Even more preferred are tertiary amines, such as dimorpholino diethyl ether, and a metal alkanoate, such as bismuth octoate. Included in the useful catalysts are organotin compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. Dialkyl tin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. The organo tin or metal alkanoate catalyst is present in an amount of about 60 parts per million or greater based on the weight of the composition, more preferably 120 parts by million or greater. The organo tin or metal alkanoates catalyst is present in an amount of about 1.0 percent or less based on the weight of the composition, more preferably 0.5 percent by weight or less and most preferably 0.1 percent by weight or less.

Useful tertiary amine catalysts include dimorpholinodialkyl ether, a di((dialkylmorpholino)alkyl)ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine and mixtures thereof. A preferred dimorpholinodialkyl ether is dimorpholinodiethyl ether. A preferred di((dialkylmorpholino)alkyl) ether is (di-(2-(3,5-dimethylmorpholino)ethyl)-ether). One class of tertiaty amines comprise diazabicyclo compounds which are compounds which have diazobicyclo structures. It is preferable to use diazabicyclo compounds in two-part systems. Among preferred diazabicyclo hydrocarbons include diazabicycloalkanes and diazabicyclo alkene salts. In some embodiments, it is preferable that the catalyst comprises one or more diazabicycloalkanes and one or more diazabicyclo alkene salts. Where both classes of compounds are present, the mole ratio of the one or more diazabicycloalkanes to the one or more diazabicycloalkene salts is preferably about 1:9 or greater; more preferably about 2:8 or greater; and most preferably about 4:6 or greater. Where both classes of compounds are present, the mole ratio of the one or more diazabicycloalkanes to the one or more diazabicycloalkene salts is preferably about 9:1 or less; more preferably about 8:2 or less; and most preferably about 6:4 or less. Preferred diazabicycloalkanes include diazabicyclooctane, available from Air Products under the trademark and designations, DABCO, DABCO WT, DABCO DC 1, DABCO DC 2, and DABCO DC 21. Preferred diazabicycloalkene salts include diazabicycloundecene in the phenolate, ethylhexoate, oleate and formiate salt forms, available from Air Products under the trademark and designations, POLYCAT SA 1, POLYCAT SA 1/10, POLYCAT SA 102 and POLYCAT SA 610. In a preferred embodiment, one or more diazabicyclo compounds and one or more organometallic and/or tertiary amine catalysts are present in the adhesive system. Tertiary amines are preferably employed in an amount, based on the weight of the composition of about 0.01 percent by weight or greater, more preferably about 0.05 percent by weight or greater, even more preferably about 0.1 percent by weight or greater and most preferably about 0.2 percent by weight or greater and about 2.0 percent by weight or less, more preferably about 1.75 percent by weight or less, even more preferably about 1.0 percent by weight or less and most preferably about 0.4 percent by weight or less.

The composition of this invention may further comprise stabilizers, which function to protect the adhesive composition from moisture, thereby inhibiting advancement and preventing premature crosslinking of the isocyanates in the curable composition. Stabilizers known to the skilled artisan for moisture curing adhesives may be used preferably herein. Included among such stabilizers are diethylmalonate, alkylphenol alkylates, paratoluene sulfonic isocyanates, benzoyl chloride and orthoalkyl formates. Such stabilizers are preferably used in an amount of about 0.1 parts by weight or greater based on the total weight of the curable composition, preferably about 0.5 parts by weight or greater and more preferably about 0.8 parts by weight or greater. Such stabilizers are used in an amount of about 5.0 parts by weight or less based on the weight of the curable composition, more preferably about 2.0 parts by weight or less and most preferably about 1.4 parts by weight or less.

In some embodiments the composition may further comprise an adhesion promoter, such as those disclosed in Mandi, U.S. Patent Publication 2002/0100550 paragraphs 0055 to 0065 and Hsieh, U.S. Pat. No. 6,015,475 column 5, line 27 to column 6, line 41 incorporated herein by reference. The amounts of such adhesion promoters useful are also disclosed in these references and incorporated herein by reference.

The composition may further comprise a hydrophilic material that functions to draw atmospheric moisture into the composition. This material enhances the cure speed of the formulation by drawing atmospheric moisture to the composition. Preferably, the hydrophilic material is a liquid. Among preferred hydroscopic materials are pyrrolidones such as 1 methyl-2-pyrrolidone (or N-methylpyrrolidone). The hydrophilic material is preferably present in an amount of about 0.1 parts by weight or greater and more preferably about 0.3 parts by weight or greater and preferably about 1.0 parts by weight or less and most preferably about 0.6 parts by weight or less.

The two part compositions may comprise a curing agent located in the second part. Such curative is a composition that contains greater than one active hydrogen containing functional group. The curing agents preferably contain hydroxyl or amine functional groups. The curing agents can be one or more chain extenders, crosslinking agents, polyols or polyamines. Polyols as described hereinbefore can be utilized as curing agents. One class of polyols or polyamines can be prepolymers as described hereinbefore prepared utilizing excess equivalents of active hydrogen functional groups such that the resulting prepolymers contain active hydrogen functional groups, preferably hydroxyl and or amino groups.

The isocyanate functional curable compositions may further comprise one or more low molecular weight compounds having two or more isocyanate reactive groups and a hydrocarbon backbone wherein the backbone may further comprise one or more heteroatoms. It is advantageous to use such low molecular weight compounds in two-part compositions. Such low molecular weight compounds may be compounds known in the art as chain extenders, such compounds are difunctional. Such low molecular weight compounds may be compounds also known in the art as crosslinkers, such compounds have, on average, greater than two active hydrogen groups per compound. The heteroatoms in the backbone can be oxygen, sulfur, nitrogen or a mixture thereof, wherein oxygen, nitrogen or a mixture thereof is more preferred and oxygen is most preferred. Preferably, the molecular weight of the low molecular weight compound is about 120 or less and more preferably about 100 or less. Preferably, the low molecular weight compound comprises one or more multifunctional alcohols, multifunctional alkanol amines, one or more adducts of multifunctional alcohol and an alkylene oxide, one or more adducts of a multifunctional alkanol amine and an alkylene oxide or a mixture thereof. Among preferred multifunctional alcohols and multifunctional alkanol amines are ethane diol, propane diol, butane diol, hexane diol, heptane diol, octane diol, glycerine, trimethylol propane, pentaerythritol, neopentyl glycol, ethanol amines (diethanol amine, triethanol amine) and propanol amines (di-isopropanol amine, tri-isopropanol amine) and the like. Blends of various low molecular weight compounds may be used. The low molecular weight compound is used in a sufficient amount to obtain the desired G-Modulus (E-Modulus). In two-part compositions, the low molecular compound may be located in the resin side, the curative side or both. Preferably, the low molecular weight compound is located in the curative side. Preferably, the low molecular weight compound is present in composition in an amount of about 2 percent by weight or greater, more preferably about 2.5 percent by weight or greater and most preferably about 3.0 percent by weight or greater. Preferably, the low molecular weight compound is present in the composition in an amount of about 10 percent by weight or less, more preferably about 8 percent by weight or less and most preferably about 6 percent by weight or less.

In a two-part isocyanate functional curable system, the curative part may further comprise polyoxyalkylene polyamine having 2 or greater amines per polyamine. Preferably, the polyoxyalkylene polyamine has 2 to 4 amines per polyamine and most preferably 2 to 3 amines per polyamine. Preferably, the polyoxyalkylene polyamine has a weight average molecular weight of about 200 or greater and most preferably about 400 or greater. Preferably, the polyoxyalkylene polyamine has a weight average molecular weight of about 5,000 or less and most preferably about 3,000 or less. Among preferred polyoxyalkylene polyamines are JEFFAMINE™ D-T-403 polypropylene oxide triamine having a molecular weight of about 400 and JEFFAMINE™ D-400 polypropylene oxide diamine having a molecular weight of about 400. The polyoxyalkylene polyamines are present in a sufficient amount to prevent the composition from sagging once mixed and applied. Preferably, the polyoxyalkylene polyamine is present in the curable composition in an amount of about 0.2 percent by weight or greater, more preferably about 0.3 percent by weight or greater and most preferably about 0.5 percent by weight or greater. Preferably, the polyoxyalkylene polyamine is present in the curable composition in an amount of about 6 percent by weight or less, more preferably about 4 percent by weight or less and most preferably about 2 percent by weight or less.

The two parts of the curable compositions are preferably combined such that the equivalents of isocyanate groups are greater than the equivalents of the isocyanate reactive groups. More preferably, the equivalents ratio of isocyanate groups to equivalents of isocyanate reactive groups is greater than about 1.0:1.0, even more preferably about 1.05:1.0 or greater and most preferably about 1.10:1.0 or greater. More preferably, the equivalents ratio of isocyanate groups to isocyanate reactive groups is about 2.0:1.0 or less, and most preferably about 1.40:1.0 or less.

Other components commonly used in curable compositions may be used in the compositions of this invention. Such materials are well known to those skilled in the art and may include ultraviolet stabilizers and antioxidants and the like.

As used herein all parts by weight relative to the components of the curable composition are based on 100 total parts by weight of the curable composition. In compositions useful in preparing molded parts, the compositions may further comprise components commonly used in molding parts such as mold release agents, fillers, conductive components and the like. In compositions used to form foams, such compositions may further comprise ingredients commonly used in foam forming compositions, such as blowing agents, mold release agents, skin forming agents and the like.

The composition of this invention may be formulated by blending the components together using means well known in the art. Generally, the components are blended in a suitable mixer. Such blending is preferably conducted in an inert atmosphere in the absence of oxygen and atmospheric moisture to prevent premature reaction. It may be advantageous to add plasticizers to the reaction mixture for preparing the isocyanate functional prepolymers so that such mixtures may be easily mixed and handled. Alternatively, the plasticizers can be added during blending of all the components. Preferably, the materials are blended under vacuum or an inert gas, such as nitrogen or argon. The ingredients are blended for a sufficient time to prepare a well blended mixture, preferably from about 10 to about 60 minutes. Once the composition is formulated, it is packaged in a suitable container such that it is protected from atmospheric moisture and oxygen. Contact with atmospheric moisture and oxygen could result in premature crosslinking of the prepolymers containing isocyanate groups.

The compositions of the invention may be used to bond a variety of substrates together as described hereinbefore. The composition can be used to bond porous and nonporous substrates together. The composition is applied to a substrate and the composition on the first substrate is thereafter contacted with a second substrate. In preferred embodiments, the surfaces to which the composition is applied are cleaned and in case activated and/or primed prior to application, see for example, U.S. Pat. Nos. 4,525,511; 3,707,521 and 3,779,794, relevant parts of all are incorporated herein by reference. Generally the one part adhesive compositions of the invention are applied at temperature at which the compositions can be pumped. The one part adhesive compositions cure in the presence of atmospheric moisture. Exposure to atmospheric moisture is sufficient to result in curing of the composition. Curing can be accelerated by the addition of additional water or by applying heat to the curing composition by means of convection heat, microwave heating and the like. Preferably, the one part adhesive compositions of the invention is formulated to provide an open time of at least about 3 minutes or greater more preferably about 5 minutes or greater. "Open time" is understood to mean the time after application of the composition to a first substrate until it starts to become a high viscous paste and is not subject to deformation during assembly to conform to the shape of the second substrate and to adhere to it.

The adhesive compositions of the invention may used to bond glass or abrasion coated transparent plastic to other substrates such as metal or plastics. In a preferred embodiment the first substrate is a window and the second substrate is a window frame. In another preferred embodiment the first substrate is a window and the second substrate is a window frame of an automobile. Preferably, the glass window is cleaned and may have a glass wipe or primer applied to the area to which the adhesive is to be bonded. The window flange may be primed with a paint primer. The composition is applied in a bead to the periphery of the window located such that it will contact the window flange when placed in the vehicle. The window with the composition located thereon is then placed into the flange with the composition located between the window and the flange. The bead of the composition is a continuous bead that functions to seal the junction between the window and the window flange. A continuous bead of the composition is a bead that is located such that the bead connects at each end to form a continuous seal between the window and the flange when contacted. Thereafter the composition is allowed to cure.

In use, the components of two-part compositions are blended as would normally be done when working with such materials. For a two-part compositions to be most easily used in commercial and industrial environments, the volume ratio at which the two parts are combined should be a convenient whole number. This facilitates application of the curable composition with conventional, commercially available dispensers including static and dynamic mixing. Such dispensers with static mixing are shown in U.S. Pat. Nos. 4,538,920 and 5,082,147 (incorporated herein by reference) and are available from Conprotec, Inc. (Salem, N.J.) under the trade name MIXPAC or SULZER™ QUADRO of Sulzer Ltd., Switzerland. Typically, these dispensers use a pair of tubular receptacles arranged side-by-side with each tube being intended to receive one of the two parts of the polymerizable composition. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended polymerizable composition is extruded from the mixing chamber onto a substrate. When using electrically-driven equipment, dynamic mixing may be used. Once the tubes have been emptied, they can be replaced with fresh tubes and the application process continued. The volumetric ratio at which the two parts of the polymerizable composition are combined is controlled by the diameter of the tubes. (Each plunger is sized to be received within a tube of fixed diameter, and the plungers are advanced into the tubes at the same speed.) A single dispenser is often intended for use with a variety of different two-part polymerizable compositions and the plungers are sized to deliver the two parts of the polymerizable composition at a convenient mix ratio. The two parts of the curable compositions are preferably combined such that the equivalents of isocyanate groups are greater than the equivalents of the isocyanate reactive groups. More preferably, the equivalents ratio of isocyanate groups to equivalents of isocyanate reactive groups is greater than about 1.0:1.0, even more preferably about 1.05:1.0 or greater and most preferably about 1.10:1.0 or greater. More preferably, the equivalents ratio of isocyanate groups to isocyanate reactive groups is about 2.0:1.0 or less, and most preferably about 1.40:1.0 or less. Some common mix ratios are 1:1, 2:1, 4:1 and 10:1. Preferably, the two parts are blended at a mix ratio of about 1:1.

Preferably, the mixed two-part compositions of the invention have a suitable viscosity to allow application without dripping. Preferably, the viscosities of the two individual components should be of the same order of magnitude. Preferably, for compositions mixed utilizing static mixing, the components prior to cure have a viscosity of about 10 Pa·S (10,000 centipoises) or greater, more preferably about 20 Pa·S (20,000 centipoises) or greater and most preferably about 40 Pa·S (40,000 centipoises) or greater. Preferably, the two parts of the compositions have a viscosity prior to contacting of about 150 Pa·S (150,000 centipoises) or less, more preferably about 120 Pa·S (120,000 centipoises) or less and most preferably about 100 Pa·S (100,000 centipoises) or less. "Viscosities" as used in this passage are determined at a shear rate of 20 reciprocal second measured with a cone plate rheometer of 20 mm diameter and 4° angle. Higher viscosities require dynamic mixing. For lower viscosities, the components may require gelling agent known in the art to prevent sag of the uncured adhesive system. Two-part adhesive compositions start to cure upon mixing the two parts. Curing can be accelerated by applying heat to the curing adhesive by means of induction heat, convection heat, microwave heating and the like.

In another embodiment the compositions of the invention can be used to bond modular components to a car body or to each other. Examples of modular components include vehicle modules, such as door, window or body.

Molecular weights as described herein are number average molecular weights which may be determined by Gel Permeation Chromatography (also referred to as SEC). For polyurethane prepolymers, it is also possible to calculate approximate number average molecular weight from the equivalent ratio of the isocyanate compounds and of the polyol compounds with which they are reacted as known to the persons skilled in the art.

ILLUSTRATIVE EMBODIMENTS OF THE INVENTION

The following examples are provided to illustrate the invention, but are not intended to limit the scope thereof. All parts and percentages are by weight unless otherwise indicated.

EXAMPLES

An adhesive composition Betaseal 57302 polyurethane adhesive containing an isocyanate prepolymer having no alkoxysilane groups attached to the prepolymer, a branched plasticizer, a high surface area carbon black and diethyl dimorpholino ether is used in the following testing. Adhesive compositions are prepared some with various stabilizers added and some without stabilizers added. A number of quick knife adhesion samples are prepared as described hereinafter. The samples are allowed to cure for 7 days at 23° C. at fifty percent relative humidity. Thereafter they are exposed to elevated temperatures for various periods of time and then subjected to Quick Knife Adhesion testing. The percentage of cohesive failure for each is recorded. Tables 1 to 4 illustrate the results.

Quick Knife Adhesion Test

The quick knife adhesion test is performed by applying to a substrate as described below a bead of adhesive with a defined geometry of 10 mm (height)×10 to 15 mm (width)×200 mm (length). The adhesive is compressed to a height of about 6 mm. The structure is exposed to conditions as detailed hereinafter. To evaluate adhesion performance, the adhesive strip is cut on edge approximately 10 mm parallel to the substrate and peeled off in a 90 degree angle. Approximately each 10 mm, the peeled off bead is cut with a knife to the substrate and the peeling is continued. The peeled samples are rated according to the percent of cohesive failure, meaning failure within the hardened bulk of the adhesive. Cohesive failure means the adhesive separates in the bulk polymer mass. The samples tested are 1 inch×6 inch (2.54 cm×15.24 cm) or 4 inch×6 inch (10.16 cm×15.24 cm) glass or metal coupons having a Betaseal 43518 clear primer and Betaseal 43520A blackout primer applied to the surface of the coupon before applying the adhesive. After initial curing the samples are placed in a convection oven at the temperatures and times stated in the following tables.

Example 1

Samples prepared as described hereinbefore with and without using Xenoyl nitrile oxide (4-dihydroxy-2,2,6,6-tetramethylpiperidinyl oxide) stabilizers. The samples are exposed to 110° C. for various times and then tested according to the Quick knife adhesion test. The percent cohesive failure is listed in Table 1 for each sample.

TABLE 1

| Days at 110° C. | Adhesive with .2% Stabilizer | Adhesive without Stablizer | Adhesive without Stabilizer |
| --- | --- | --- | --- |
| 0 | 100 | 100 | 100 |
| 3 | 100 | 20 | 100 |
| 4 | 100 | 10 | 100 |
| 5 | 100 | 5 | 20 |
| 6 | 100 | 5 | 20 |
| 7 | 100 | 5 | 10 |
| 10 | 100 | 5 | 5 |
| 12 | 95 | 5 | 5 |
| 13 | 100 | 10 | 10 |
| 14 | 100 | 10 | 2 |
| 18 | 80 | 5 | 2 |

Table 1 illustrates the improved heat durability performance of the adhesive system at 110° C. with nitrile oxide stabilizer as compared to adhesive systems that do not contain the nitrite oxide stabilizer. FIG. 1 shows the data of Table 1 in graphical form.

Example 2

Samples prepared as described hereinbefore with and without using Xenoyl 4-dihydroxy-2,2,6,6-tetramethylpiperidinyl oxide stabilizers. The samples are exposed to 100° C. for various times and then tested according to the Quick knife adhesion test. The percent cohesive failure is listed in Table 2 for each sample.

TABLE 2

| Days at 100° C. | Adhesive with .2% Nitrile Oxide | Days at 100° C. | Adhesive without Stablizer | Days at 100° C. | Adhesive without Stablizer |
| --- | --- | --- | --- | --- | --- |
| 0 | 100 | 0 | 100 | 0 | 100 |
| 6 | 100 | 6 | 100 | 6 | 100 |
| 11 | 100 | 8 | 100 | 11 | 100 |
| 18 | 100 | 11 | 95 | 18 | 98 |
| 21 | 100 | 18 | 40 | 21 | 100 |
| 25 | 100 | 21 | 10 | 25 | 10 |
| 28 | 100 | 25 | 15 | 28 | 15 |
| 36 | 100 | 28 | 10 | 31 | 15 |
| | | 31 | 10 | 36 | 10 |
| | | 36 | 10 | | |

Figure 2:
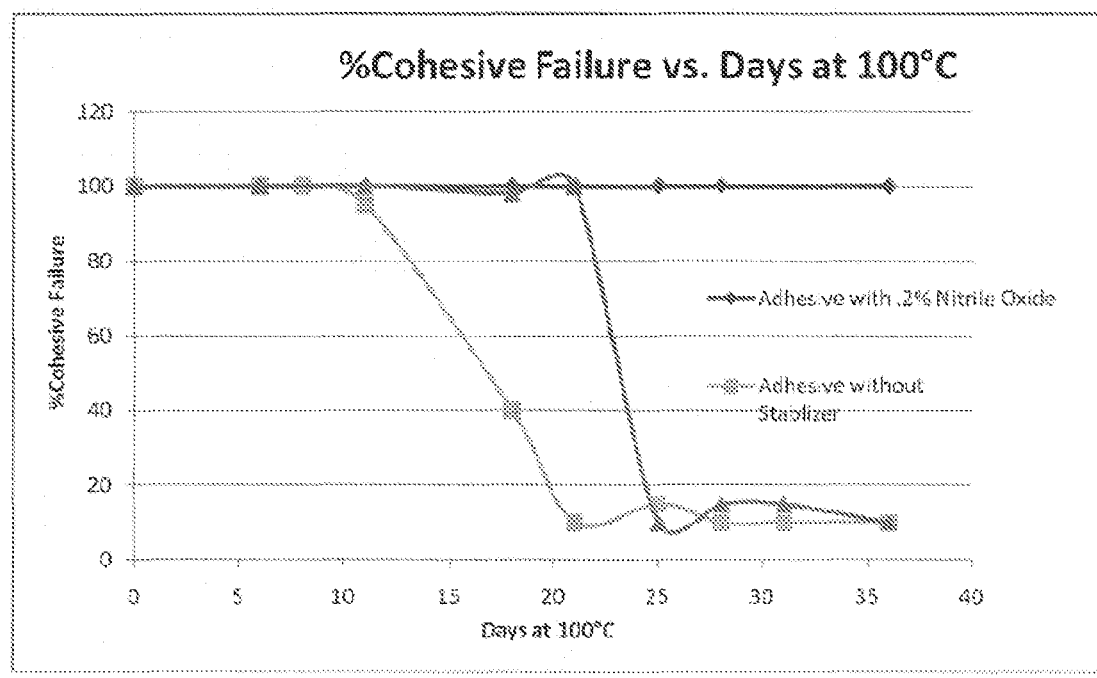
FIG. 2 is a graphical representation of the data contained in Table 2.

Table 2 illustrates the improved heat durability performance of the adhesive system at 100° C. with nitrile oxide stabilizer as compared to adhesive systems that do not contain the nitrile oxide stabilizer. FIG. 2 shows the data of Table 2 in graphical form.

Example 3

Samples prepared as described hereinbefore using Xenoyl 4-dihydroxy-2,2,6,6-tetramethylpiperidinyl oxide, butylated hydroxyl toluene (BHT) stabilizers and samples without stabilizers. The samples are exposed to 110° C. for various times and then tested according to the Quick knife adhesion test. The percent cohesive failure is listed in Table 3 for each sample.

| Days at 110° C. | nitrile oxide | no stabilizer | no stabilizer | Days at 110° C. | 0.05% BHT (thin bead) | Days at 110° C. | 0.05% BHT |
| --- | --- | --- | --- | --- | --- | --- | --- |
| 0 | 100 | 100 | 100 | 0 | 100 | 0 | 100 |
| 3 | 100 | 20 | 100 | 7 | 100 | 3 | 10 |
| 4 | 100 | 10 | 100 | 9 | 90 | 4 | 10 |
| 5 | 100 | 5 | 20 | 11 | 80 | 5 | 5 |
| 6 | 100 | 5 | 20 | | | 6 | 5 |
| 7 | 100 | 5 | 10 | | | 7 | |
| 11 | 100 | 5 | 5 | | | 11 | |
| 12 | 95 | 5 | 5 | | | 12 | |
| 13 | 100 | 10 | 10 | | | 13 | |
| 14 | 100 | 10 | 2 | | | 14 | |
| 18 | 80 | 5 | 2 | | | 18 | |

Figure 3:
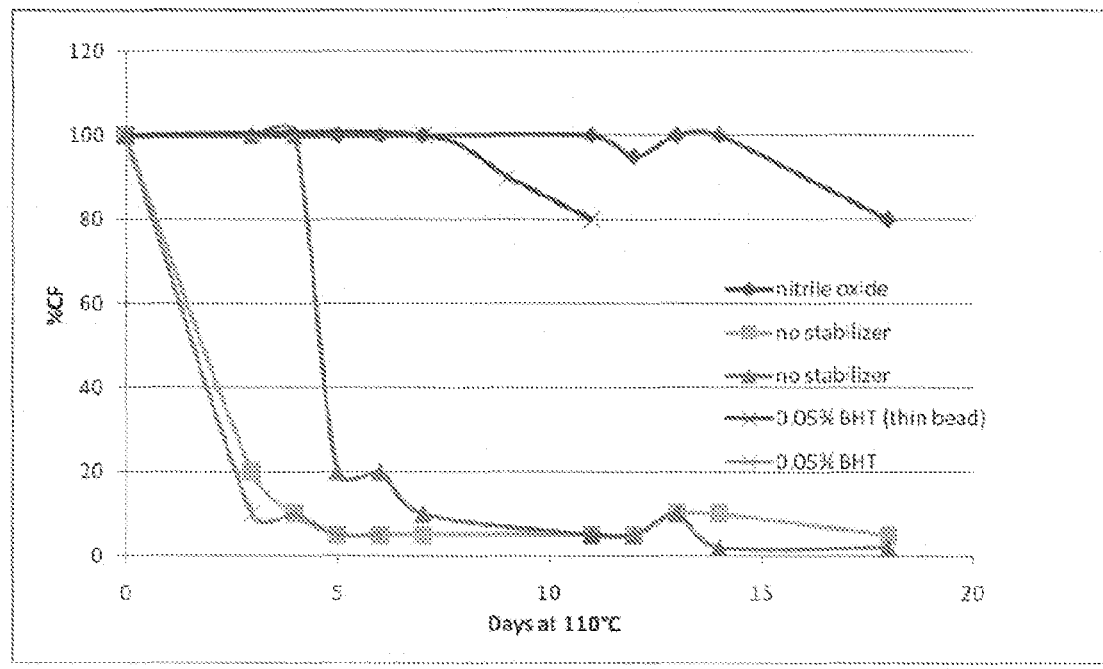
FIG. 3 is a graphical representation of the data contained in Table.

Table 3 illustrates that compositions containing nitrile oxide stabilizers exhibit better durability than compositions containing butylated hydroxyl toluene stabilizers or no stabilizers. FIG. 3 shows the data of Table 3 in graphical form.

Example 4

Samples prepared as described hereinbefore using Xenoyl 4-dihydroxy-2,2,6,6-tetramethylpiperidinyl oxide, bis(2,2,6,6,-tetramethyl-4-piperidinyl) sebecate decanedioate (HALS) and butylated hydroxyl toluene (BHT) stabilizers and samples without stabilizers. The samples are exposed to 110° C. for various times and then tested according to the Quick knife adhesion test. The percent cohesive failure is listed in Table 4 for each sample.

TABLE 4

| Days at 110° C. | 0.2% Nitrile Oxide | No Stabilizer | No Stabilizer | Days at 110° C. | with 0.05% BHT | Days at 110° C. | with HALS, UV absorber and TNPP* |
| --- | --- | --- | --- | --- | --- | --- | --- |
| 0 | 100 | 100 | 100 | 0 | 100 | 0 | 100 |
| 3 | 100 | 20 | 100 | 3 | 10 | 3 | 90 |
| 4 | 100 | 10 | 100 | 4 | 10 | 6 | 10 |
| 5 | 100 | 5 | 20 | 5 | 5 | 7 | 0 |
| 6 | 100 | 5 | 20 | 6 | 5 | 9 | 0 |
| 7 | 100 | 5 | 10 | 7 | | | |
| 11 | 100 | 5 | 5 | 11 | | | |
| 12 | 95 | 5 | 5 | 12 | | | |
| 13 | 100 | 10 | 10 | 13 | | | |
| 14 | 100 | 10 | 2 | 14 | | | |
| 18 | 80 | 5 | 2 | 18 | | | |

Figure 4:
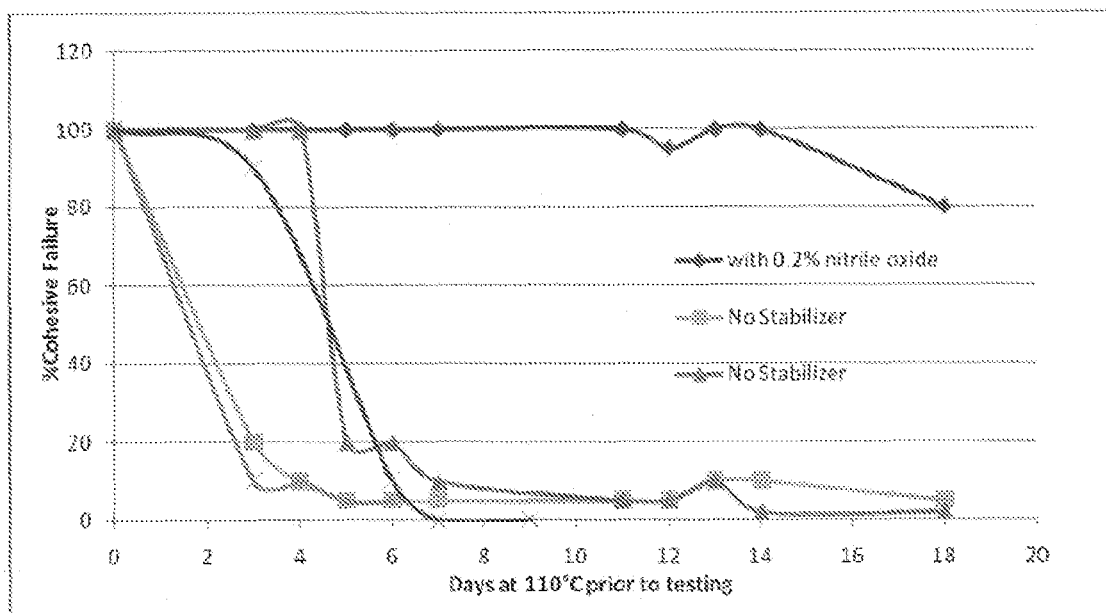
FIG. 4 is a graphical representation of the data contained in Table.

Table 4 illustrates that compositions containing nitrile oxide stabilizers exhibit better durability than compositions containing bis(2,2,6,6,-tetramethyl-4-piperidinyl) sebecate decanedioate (HALS) stabilizers, or butylated hydroxyl toluene stabilizers or no stabilizers. FIG. 4 shows the data of Table 4 in graphical form.

What is claimed is:
1. A composition comprising
  a) about 40 to about 70 percent by weight of one or more isocyanate functional prepolymers having an isocyanate content of about 0.5 to about 5.0 percent by weight based on the weight of the isocyanate functional prepolymers;

b) about 0.01 to about 2 percent by weight of one or more catalysts for the reaction of isocyanate moieties with active hydrogen atom containing;
c) one or more compounds comprising a dihydrocarbyl hydroxyl amine, an alicyclic hydroxyl amine, a nitroxyl of a dihydrocarbyl hydroxyl amine wherein the nitroxyl is a group having the structure —NO. or a nitroxyl of an alicyclic hydroxyl amine wherein the nitroxyl is a group having the structure —NO. present in an amount of about 0.1 to about 0.5 percent by weight;
d) about 5 to about 35 percent by weight of one or more fillers; and
e) about 5 to about 40 percent by weight of one or more plasticizers;
wherein the amounts are based on the weight of the composition and the composition forms a polymeric matrix that is cured.

2. A composition according to claim 1 wherein the filler is a reinforcing filler.

3. A composition according to claim 2 wherein the reinforcing filler is carbon black.

4. A composition according to claim 2 wherein the carbon black is a high surface area carbon black which exhibits an iodine number of 130 mg/g or greater.

5. A composition according to claim 1 wherein the plasticizer is a branched plasticizer.

6. A composition according to claim 1 wherein the hydroxyl amines correspond to the formula $(R^1)_2N$—OH and the nitroxyls of hydroxyl amines correspond to the formula $(R^1)_2$—N—O. wherein $R^1$ is independently in each occurrence a hydrocarbyl moiety or two $R^1$ form a cyclic ring and the hydrocarbyl moieties may be substituted with a substituent which does not interfere in stabilizing the composition, wherein the substituent is hydroxyl, alkyl groups, ethers, tertiary amines or sulfides.

7. A composition according to claim 6 wherein the stabilizer is nitroxyl of a hydroxyl amine wherein the nitroxyl is a group having the structure —NO.

8. A composition according to claim 7 wherein the stabilizer is a nitroxyl of 4-hydroxy-2,2,6,6-tetramethyl piperdinyl oxide wherein the nitroxyl is a group having the structure —NO.

9. A composition according to claim 1 wherein the composition is a one part curable composition.

10. A composition according to claim 9 wherein the composition is substantially free of alkoxy silane groups.

11. A composition comprising
a) about 40 to about 70 percent by weight of one or more isocyanate functional prepolymers having an isocyanate content of about 6 to 35 percent by weight based on the weight of the isocyanate prepolymers;
b) one or more catalysts for the reaction of isocyanate moieties with active hydrogen atom containing groups present in an amount of about 0.01 to about 2 percent by weight;
c) one or more compounds comprising a dihydrocarbyl hydroxyl amine, an alicyclic hydroxyl amine, a nitroxyl of a dihydrocarbyl hydroxyl amine wherein the nitroxyl is a group having the structure —NO. or a nitroxyl of an alicyclic hydroxyl amine wherein the nitroxyl is a group having the structure —NO. present in an amount of about 0.1 to about 0.5 percent by weight based on the weight of the composition;
d) about 5 to about 35 percent by weight of one or more fillers; and
e) about 5 to about 40 percent by weight one or more plasticizers;
wherein the amounts are based on the weight of the composition and the composition is a two part composition wherein part 1 comprises one or more isocyanate functional components; part 2 comprises one or more catalysts for the reaction of isocyanate moieties with active hydrogen atom containing groups and one or more components containing more than one active hydrogen containing groups; and the one or more compounds comprising a dihydrocarbyl hydroxyl amine, an alicyclic hydroxyl amine, a nitroxyl of a dihydrocarbyl hydroxyl amine wherein the nitroxyl is a group having the structure —NO. or of a nitoxyl of an alicyclic hydroxyl amine, wherein the nitroxyl is a group having the structure —NO., may be present in part 1, part 2 or both.

12. A method of bonding two or more substrates together which comprises contacting the two or more substrates together with a composition according to claim 1 disposed along at least a portion of the area wherein the substrates are in contact.

13. A method according to according to claim 12 wherein at least one of the substrates is window glass and at least one of the other substrates is a building or a vehicle.

14. A method according to claim 13 wherein the composition is a two part composition and the parts are contacted together prior to contacting the composition with one or more of the substrates.

15. A composition according to claim 1 wherein the one or more isocyanate functional prepolymers are the reaction product of a mixture of one or more polyether diols and one or more polyether triols.

16. A composition according to claim 1 wherein the composition includes a polyfunctional isocyanate.

* * * * *